US010676373B2

(12) United States Patent
Al-Ghizzy

(10) Patent No.: US 10,676,373 B2
(45) Date of Patent: Jun. 9, 2020

(54) THERMAL UTILIZATION SYSTEM AND METHODS

(71) Applicant: Husham Al-Ghizzy, Anaheim, CA (US)

(72) Inventor: Husham Al-Ghizzy, Anaheim, CA (US)

(73) Assignee: Husham Al-Ghizzy, Los Gatos, CA (US)

( * ) Notice: Subject to any disclaimer, the term of this patent is extended or adjusted under 35 U.S.C. 154(b) by 197 days.

(21) Appl. No.: 14/988,320

(22) Filed: Jan. 5, 2016

(65) Prior Publication Data

US 2016/0194217 A1 Jul. 7, 2016

Related U.S. Application Data

(60) Provisional application No. 62/124,827, filed on Jan. 5, 2015.

(51) Int. Cl.
*C02F 1/14* (2006.01)
*C02F 1/16* (2006.01)
(Continued)

(52) U.S. Cl.
CPC .............. *C02F 1/14* (2013.01); *B01D 1/0035* (2013.01); *B01D 1/0058* (2013.01); *B01D 1/26* (2013.01);
(Continued)

(58) Field of Classification Search
CPC ...... B01D 1/0035; B01D 1/0058; B01D 1/26; B01D 5/006; B01D 3/101; C02F 1/14; C02F 1/16; C02F 2103/08; F01K 5/00
See application file for complete search history.

(56) References Cited

U.S. PATENT DOCUMENTS 2,863,501 A * 12/1958 Farnsworth .......... B01D 1/2803
159/24.1
3,096,257 A * 7/1963 Foutz ........................ C02F 1/04
202/205
(Continued)

FOREIGN PATENT DOCUMENTS

CN 2232916 Y 8/1996
CN 201151676 Y 11/2008
(Continued)

OTHER PUBLICATIONS

FR2397741A1_ENG (English translation of Batonneau by Espacenet) (Year: 1979).*
(Continued)

*Primary Examiner* — Jonathan Miller
*Assistant Examiner* — Gabriel E Gitman
(74) *Attorney, Agent, or Firm* — Fish & Richardson P.C.

(57) ABSTRACT

A thermal utilization plant including a heat engine and a cooling system for the heat engine. The heat engine is operable to receive heat from a non-carbon heat source (carbon heat source can be used) and to transfer heat to the cooling system. The cooling system includes an evaporator configured to vaporize a working fluid to a vapor state. A condenser is coupled to the evaporator by a conduit and operable to receive the working fluid in the vapor state and to condense the working fluid to a fluid state. An output is coupled to the condenser and operable to receive the working fluid from the condenser and to provide the working fluid for beneficial use.

20 Claims, 14 Drawing Sheets

(51) Int. Cl.

| | | |
|---|---|---|
| *B01D 1/00* | (2006.01) | |
| *B01D 1/26* | (2006.01) | |
| *B01D 3/10* | (2006.01) | |
| *B01D 5/00* | (2006.01) | |
| *F01K 5/00* | (2006.01) | |
| *C02F 103/08* | (2006.01) | |

(52) U.S. Cl.
CPC ............. *B01D 3/101* (2013.01); *B01D 5/006* (2013.01); *C02F 1/16* (2013.01); *F01K 5/00* (2013.01); *C02F 2103/08* (2013.01)

(56) References Cited

U.S. PATENT DOCUMENTS

| | | | | |
|---|---|---|---|---|
| 4,343,683 | A * | 8/1982 | Diggs | B01D 3/08 |
| | | | | 203/2 |
| 4,805,692 | A * | 2/1989 | Palmer | B01D 1/0082 |
| | | | | 165/110 |
| 6,299,766 | B1 * | 10/2001 | Permar | B01D 61/022 |
| | | | | 210/137 |
| 6,436,242 | B1 | 8/2002 | Belmar et al. | |
| 6,491,813 | B2 * | 12/2002 | Verde | B01D 61/06 |
| | | | | 210/137 |
| 6,701,721 | B1 | 3/2004 | Berchowitz | |
| 6,775,982 | B1 | 8/2004 | Kitamura et al. | |
| 7,708,865 | B2 | 5/2010 | Holtzapple et al. | |
| 7,922,874 | B2 * | 4/2011 | Ophir | B01D 1/26 |
| | | | | 202/174 |
| 8,469,091 | B2 * | 6/2013 | Bjorklund | E21B 41/0057 |
| | | | | 166/266 |
| 9,428,403 | B2 * | 8/2016 | Haynes | B01D 1/0035 |
| 2004/0045682 | A1 * | 3/2004 | Liprie | B01D 1/0017 |
| | | | | 159/31 |
| 2007/0151840 | A1 * | 7/2007 | Nurminen | B01D 1/065 |
| | | | | 203/10 |
| 2007/0235317 | A1 * | 10/2007 | Waldron | C02F 1/048 |
| | | | | 203/3 |
| 2009/0230039 | A1 * | 9/2009 | Hoenig | B01D 1/26 |
| | | | | 210/150 |
| 2011/0162952 | A1 * | 7/2011 | Conchieri | B01D 1/16 |
| | | | | 203/11 |
| 2012/0031096 | A1 * | 2/2012 | Ulas Acikgoz | F01K 25/08 |
| | | | | 60/651 |
| 2012/0085635 | A1 * | 4/2012 | Haynes | B01D 1/0035 |
| | | | | 203/11 |
| 2012/0292176 | A1 * | 11/2012 | Machhammmer | B01D 1/14 |
| | | | | 203/10 |
| 2013/0270100 | A1 * | 10/2013 | Kwak | C02F 1/14 |
| | | | | 202/174 |
| 2014/0158516 | A1 * | 6/2014 | Landrok | B01D 5/006 |
| | | | | 203/10 |
| 2014/0174080 | A1 * | 6/2014 | Friesth | F03G 7/04 |
| | | | | 60/641.1 |

FOREIGN PATENT DOCUMENTS

| | | | | |
|---|---|---|---|---|
| CN | 101475233 | A | 7/2009 | |
| CN | 202932619 | U | 5/2013 | |
| CN | 103739031 | | 4/2014 | |
| CN | 103964527 | A * | 8/2014 | ........... Y02A 20/128 |
| DE | 2734594 | A1 * | 2/1979 | .............. F24H 1/18 |
| EP | 0332267 | A1 | 3/1989 | |
| EP | 0457399 | A2 | 5/1991 | |
| FR | 2397741 | A1 * | 2/1979 | .............. F03G 7/04 |
| IT | WO2010/106565 | A1 * | 9/2010 | .............. C02F 1/04 |
| WO | 2005090240 | A1 | 9/2005 | |
| WO | 2006025117 | A1 | 9/2006 | |
| WO | 2011141944 | A2 | 11/2011 | |

OTHER PUBLICATIONS

DE2734594A1_ENG (Espacenet machine translation of Plenagl) (Year: 1979).*

FR2397741A1 (Espacenet machine translation of Batonneau) (Year: 1979).*

Al Ashkar et al. (2013). Modeling and simulation of solar thermal electric energy and water production systems. 11th International Energy Conversion Engineering Conference (Year: 2013).*

CN103964527A_ENG (Espacenet machine translation of Kong) (Year: 2014).*

U.S. Appl. No. 14/490,234, filed Sep. 18, 2014, Al Ghizyy.

Water for Energy, Excerpts from the World Energy Outlook, International Energy Agency, 2012; 33 pages; retrieved from http://www.worldenergyoutlook.org/media/weowebsite/2012/WEO_2012_Water_Excerpt.pdf.

Wikipedia—Waste Heat, retrieved from the internet on Jan. 5, 2016 from https://en.wikipedia.org/wiki/Waste_heat; 4 pgs.

Thermoelectric Power Water Use, USGS Water Science School, retrieved from the internet Jan. 5, 2016; http://water.usgs.ogv/edu/wupt.html, 3 pages.

Wikipedia—Water Scarcity, retrieved from the internet on Jan. 5, 2016, https://en.wikipedia.org/wiki/Water_scarcity; 18 pages.

Zamora et al. "California's Drought is Part of a Much Bigger Water Crisis. Here's What you Need to Know". ProPublica, Jun. 25, 2015; retrieved from the internet on Jan. 5, 2016; https://www.propublica.org/article/california-drought-colorado-river-water-crisis-explained, 10 pages.

Jorge et al. "Vulnerability of US Water Supply Shortage", 2012, RMRS-GTR-295, US Dept. Agr.Ft. Collins Co; 160 pages; http://www.fs.fed.us/rm/pubs/rmrs_gtr295.pdf.

Water Scarcity, A Selected Bibliography, U.S. Army War College Library, Jun. 2011, 19 pages; http://ww.carlisle.army.mil/library/bibs/Water_Scarcity.pdf.

Wikipedia—Renewable energy, retrieved from the internet on Jan. 5, 2016, 23 pages; https://en.wikipedia.org/wiki/Renewable_energy.

Renewable Energy: An Overview, Dept. of Energy, DOE/GO-102001-1102/FS175, Mar. 2001, 8 pages.

Sitrling Engine Design Manual, Second Edition, DOE/NASA/3194-1; NASA CR-168088, William Martini Engineering, Jan. 1983, 410 pages.

"Design of a Stirling Engine for Electricity Generation, " Project submitted to Worcester Polytechnic Institute, Sullivan, Mar. 28, 2014, 85 pages.

Gude et al. "Low Temperature Desalination: an Option for Sustainability & Energy Savings", New Mexico State Univ., http://www.gwpc.org/sites/default/files/event-sessions/Gude_Veera.pdf; 22 pages.

Wikipedia—Vapor-compression desalination, retrieved from the internet on Jan. 5, 2016, https://en.wikipedia.org/wiki/Vapor-compression_desalination ; 2 pages.

Wikipedia—Multiple-effect distillation, retrieved from the internet on Jan. 5, 2016; https://en.wikipedia.org/wiki/Multiple-effect_distillation; 3 pages.

Wikipedia—Condensation heat transfer, retreieved from the internet on Jan. 5, 2016, https://en.wikipedia.org/wiki/Condenser_(heat_transfer); 3 pages.

The Engineering ToolBox, Water—Pressure and Boiling Points, retrieved on Jan. 5, 2016 from the internet: http://www.engineeringtoolbox.com/boiling-point-water-d_926.html; 6 pages.

Wikipedia—Cogeneration, retrieved from the internet on Jan. 5, 2016, https://en.wikipedia.org/wiki/Cogeneration; 13 pages.

Parabolic Dish, Concentral Solar Power: Parabolic Dish, retrieved from the internet on Jan. 5, 2016, https://www.mtholyoke.edu/~wang30y/csp/ParabolicDish.html; 4 pages.

National Renewable Energy Laboratory_NREL: Concentraing Solar Power Projects—Dish/Engine Projects; 1 page; retrieved from the internet on Jan. 5, 2016; http://www.nrel.gov/csp/solarpaces/dish_engine.cfm; 1 page.

SES_Stirling Energy Systems Inc. Solor Dish Stirling Systems Report, NREL CSP Technology Workshop, Mar. 7, 2007, 41 pages.

Wikipedia—Exhaust heat recovery system—retrieved from the internet on Jan. 5, 2016, https://en.wikipedia.org/wiki/Exhaust_heat_recovery_system; 4 pages.

Concentrating Solar Power and Water Issues in the U.S. Southwest, Joint Institute for Strategic Energy Analysis, Technical Report NREL/TP-6A50-61376, Mar. 2015; 100 pages.

(56) References Cited

OTHER PUBLICATIONS

Automotive Stirling Engine—Mod II Design Report, DOE?NASA/0032-28, NASA CR-175106, Oct. 1986; http://ntrs.nasa.gov/archive/nasa/casi.ntrs.nasa.gov/19880002196.podf; 54 pages.

Slaby, Overview of a Stirling Engine Test Project; National Aeronautics and Space Adminstration, DOE/NASA/1040-08-12; NASA TM-81442, Apr. 1980; 28 pages.

Ferry—"A Field Guide to Renewable Energy Technologies", Land art generator initiative; http://www.landartgenerator.org/LAGI-FieldGuideRenewableEnergy-ed1.pdf; 71 pages.

Banat—Economic and Technical Assessment of Desalination Technologies, Jordan Univ. of Science and Technology, Jun. 2007; 46 pages.

Green Wombat—Texas' first Big Solar project, PG&E's deal with NRG/eSolar, Jun. 25, 2009, 3 pages.

Water World, Thermal Desalination Won't Be Killed Off by RO membranes says IDF; retrieved from the internet on Jan. 5, 2016; http://www.waterworld.com/articles/2013/06/thermal-desalination-wont-be-killed-off-by-ro-membranes-says-ide.html.

Karaghouli_Renewable Energy Opportunities in Water Desalination, Desalination, Trends and Technologies; 36 pages.

The Worlds of David Darling, Encyclopedia of Alternative Energy; Absorption refrigeration, retrieved from the internet on Jan. 5, 2016, http://www.davidarling.info.encyclopedia/A/AE_absorption_refrigeration.html, 1 page.

Wikipedia—Absorption refrigerator, retrieived from the internet on Jan. 5, 2016, https://en/wikipedia.org/wiki/Absorpotion_refrigerator; 5 pages.

* cited by examiner

THERMAL UTILIZATION SYSTEM AND METHODS

CROSS-REFERENCE TO RELATED APPLICATION

This application claims the benefit of U.S. Provisional Application No. 62/124,827, filed Jan. 5, 2015, entitled "Heat Engine and Thermal Conduction Methods", the entire contents of which is hereby incorporated by reference.

BACKGROUND

Many systems produce heat as a byproduct of generating or using power. For example, an internal combustion engine/solar heat engine/thermoelectric plant generates heat as a byproduct of creating mechanical or electrical energy. The heat may be conducted via a coolant to a radiator and there, dissipated.

SUMMARY

In a general aspect, thermal utilization systems and methods are provided. A heat engine plant may use solar, waste, or other heat to produce a useful byproduct. For example, the heat engine plant may use transferred heat to provide power, desalination, heating and/or cooling.

In some aspects, heat is removed from a system or process by a heat engine. A working fluid in a cooling system provides cooling for the heat engine, and thus the system or process that generated the heat, while using the heat transferred by the heat engine to produce a useful byproduct. The cooling system may desalinate seawater or distill other substances. In this aspect, the heat engine may be coupled between a heat source and the cooling system. The heat source may be solar power, waste heat, or other non-carbon generated heat. The heat engine may be a Stirling engine, a cogeneration engine, or other engine operable to transfer heat from a heat source to a cold source, such as a cooling system, while producing power. The heat transferred to the cooling system drives an evaporator to desalinate seawater at safe temperature. The desalinated water forms the working fluid which may be condensed for use or storage. In these aspects, the cooling system may provide an open cooling cycle.

In some aspects, the system is under vacuum. In other aspects, vacuum vapor compression may in addition be used in connection with condensation to lower the pressure in the evaporator and reduce the temperature at which the seawater boils. A heat step down attachment may be used to step down or reduce the temperature of the transferred heat. Thus, the evaporator may operate below the output temperature of the heat engine and below, for example, 70 degrees Celsius. Elevation or special pumps may be used to counter the system vacuum. The fresh water produced by desalination may be used for drinking and irrigation.

The water may also be used in connection with the process or system that generated the utilized heat. For example, solar plants, such as concentrated solar power (CSP) plants, use water for washing their mirrors and for their turbines. Thermal utilization of heat from the solar plant may in some aspects allow a solar plant to be located far from fresh water supplies.

In still other aspects, the improved cooling function allows more efficient operation of an industrial process such as solar power generation. For example, improved cooling may allow more efficient use of solar Stirling engine technology, and provide cooling without using fresh water and/or without using additional power.

In still other aspects, improved desalination is provided that eliminates or reduces thermal energy wasted in other desalination technologies such as reverse osmosis, if thermal energy used to power it. A cooling system of the thermal utilization system may lift the working fluid and condense the working fluid at an elevated height. The working fluid may be passed through a generator to generate power when returning to the evaporator and restarting the working fluid cycle. In these aspects, the cooling system of the thermal utilization system may provide a closed cooling cycle. The working fluid may be a fluorocarbon.

In still other aspects, the cooling system of the thermal utilization system can be used to provide heating and/or cooling. The heating and/or cooling can be provided in connection with desalination, in connection with power generation, and in connection with both desalination and power generation.

The details of one or more embodiments of the invention are set forth in the accompanying drawings and the description below. Other features, objects, and advantages of the invention will be apparent from the description and drawings, and from the claims.

DESCRIPTION OF DRAWINGS

Like reference symbols in the various drawings indicate like elements.

DETAILED DESCRIPTION

Figure 1:
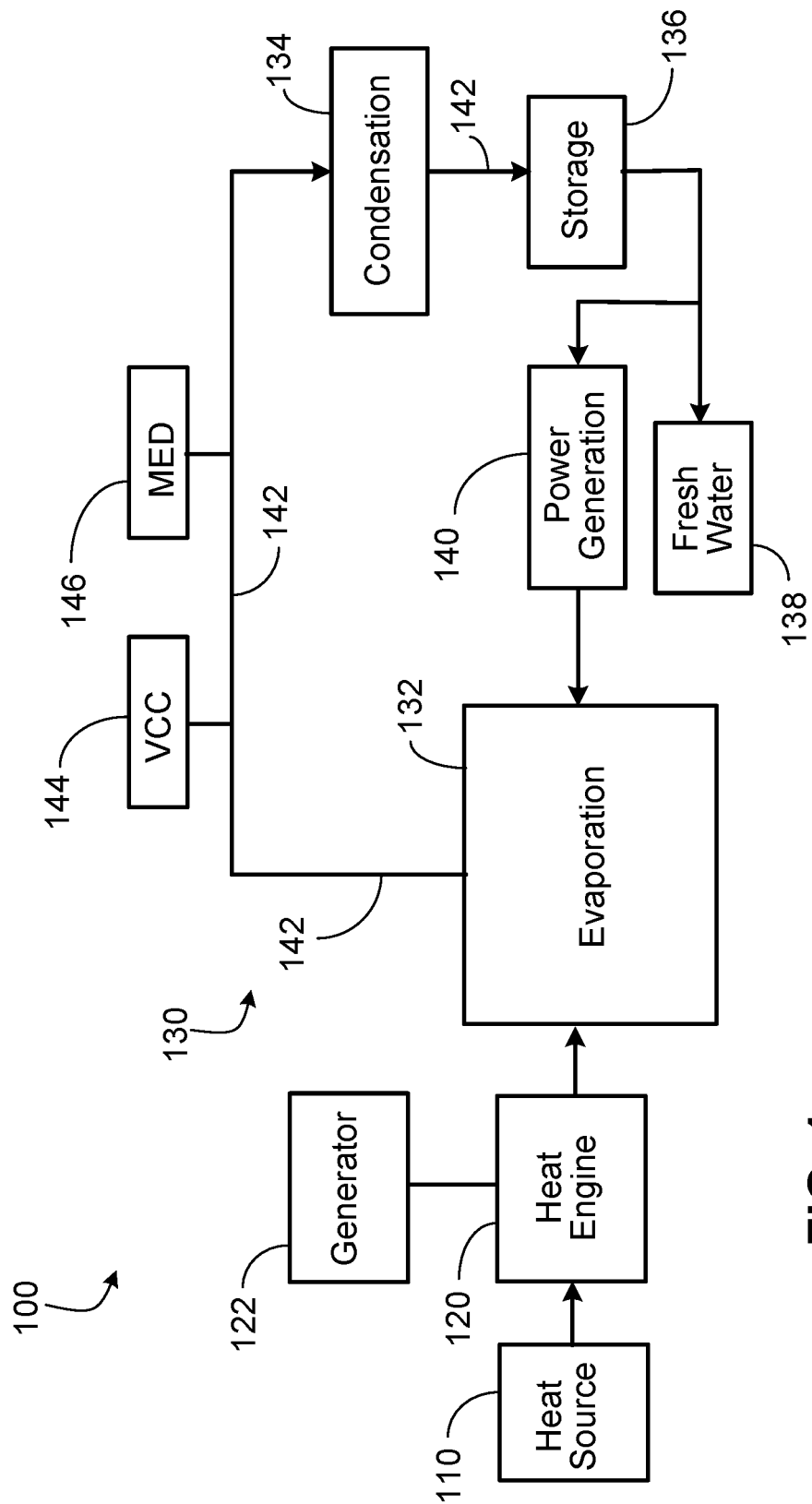
FIG. 1 is a schematic diagram of a thermal utilization or heat plant using a thermal transfer engine in accordance with one aspect of the disclosure.

FIG. 1 illustrates a thermal utilization or heat engine plant 100 in accordance with one aspect of the disclosure. The heat engine plant 100 comprises a heat engine with a cooling system that circulates a working fluid to desalinate water, generate power and/or provide heating or cooling. The working fluid cycle may be open-ended or closed-ended and the working fluid may be, for example, water or a refrigerant. In addition to producing a useful or beneficial byproduct such as power, fresh water, heating and/or cooling, the cooling system of thermal utilization plant 100 may improve efficiency of the heat engine by maintaining the cold side of the heat engine at or below a target temperature, such as an optimum or other temperature.

Referring to FIG. 1, the heat plant 100 may comprise a heat source 110, a heat engine 120, and a cooling system 130. A plant comprises a place where one or more industrial processes take place. Elements of a plant may be distributed from one another.

The heat source 110 may comprise one or more non-carbon heat sources (it can run on carbon heat source such as oil, coal) to drive the heat engine 120. The non-carbon heat sources may comprise, for example, waste heat from industrial processes such as a solar power station, a thermoelectric power station, and/or solar energy. Thus, the heat plant 100 may take advantage of abundant solar or waste energy.

The heat source 110 is coupled to the heat engine 120 which converts heat or thermal energy to mechanical energy or electrical energy (free piston Stirling engine) and acts as a heat conducting medium. Thus, the heat engine 120 may transfer heat from a solar cycle, for example, while at the same time providing mechanical and or electrical power. In one aspect, the heat engine 120 may comprise a working substance that generates work in the body of the engine 120 while transferring heat from the hot side to the colder side, or sink. During this process, some of the thermal energy is converted into work by exploiting the properties of the working substance. The working substance can be any suitable system with a non-zero heat capacity. The mechanical energy can be used to generate power or do other mechanical work.

In a specific embodiment, the heat engine 120 may comprise a Stirling engine as described in connection with FIG. 2. The heat engine may provide cogeneration or combined heat and power (CHP) and generate power while transferring heat from the heat source 110 to the cooling system. Thus, a generator 122 may be coupled to the heat engine 120 and driven by mechanical energy produced by the heat engine 120.

The cooling system 130 provides cooling for the heat engine 120 and provides thermal utilization of the heat. The cooling may also increase the efficiency of the heat engine, such as a solar or other Stirling engine. The cooling system may use the heat received from the heat engine 120 to circulate a working fluid. The working fluid may be any fluid operable, enabled, adapted, or otherwise configured to be vaporized and/or condensed for use. In some aspects of the disclosure, the working fluid may be efficiently vaporized at a base level, lifted, and/or compressed at an elevated level.

The working fluid may be, for example, water or a refrigerant. Where the working fluid comprises water, the water may be desalinated from seawater as part of the cooling cycle. Where the working fluid comprises a refrigerant, it may comprise a substance or mixture, usually a fluid, which undergoes phase transitions from a liquid to a gas, and back again. For example, the refrigerant may comprise fluorocarbons and non-halogenated hydrocarbons and other suitable fluids. The refrigerant may have favorable thermodynamic properties, be noncorrosive to mechanical components, and be safe, including free from toxicity and flammability and not cause ozone depletion or climate change. In one aspect of the disclosure, a low temperature working fluid may be used. The working fluid may be recirculated losslessly or with any losses replenished with makeup fluid.

The cooling system 130 comprises an evaporating stage 132 coupled to a condensation stage 134. The evaporating stage 132 may comprise an evaporator or other suitable equipment for evaporating or vaporizing a fluid from a liquid form to a gaseous form using heat and/or vacuum and providing cooling to the heat engine 120. The condensation stage 134 may comprise a condenser or other suitable equipment for condensing a fluid from a gaseous form to a liquid form by dissipating or otherwise rejecting heat. In some embodiments, condensation may be aided, for example enhanced or sped-up, which may lower the pressure in an upstream evaporator and aid evaporation.

The condensation stage 134 may be coupled to a storage stage 136 where the working fluid is stored. The storage stage 136 may be omitted and the working fluid directly discharged from the condensation stage 134 for use as, for example, fresh water 138 or power generation 140. The stages may each comprise one or more items of equipment or systems and may be coupled to each other by one or more conduits 142.

A conduit 142 is a structure or combination of structures and elements used to move, transmit, distribute, send or convey a thing from one place to another. For example, a conduit 142 may comprise a pipe or series of pipes linked together with intermediate elements such as fans, thermal elements and valves for moving and controlling flow of the working fluid in a pipe. A conduit 142 may be pressurized or unpressurized, insulated or uninsulated, and may be thermally treated or not treated. In the embodiments described, fans or turbines may be used in the conduits to aid vapor flow.

The evaporation stage 132, condensation stage 134, and the storage stage 136 may be directly connected in sequence or otherwise coupled to communicate between elements. As described in more detail below, other elements may be connected between stages. For example, a vacuum vapor compression (VCC) stage 144 and/or a multiple effect distillation (MED) stage 146 may be connected between the evaporation stage 132 and condensation stage 134. The vacuum vapor compression (VCC) stage 144 and/or a multiple effect distillation (MED) stage 146 may provide additional or enhanced evaporation and condensation.

The system can be configured to be an electrical generator, distiller such as desalination, and an air conditioner (cooler or heater). It may provide these beneficial outputs simultaneously or individually using solar, waste heat, or other energy source. Thus, the system may be used or merged with any solar or other power plant to make use of waste heat and cool the plant at the same time. Power generated by the system from the heat engine or steam or other working fluid cycle may be used to power fans, pumps, compressors, turbines, and other elements of the system.

Other suitable sources of energy may comprise, for example, wind energy in which the system may use ambient heat and a wind turbine to run a vacuum, compressor, or turbine to provide vacuum distillation. In addition, photovoltaic panels may be used to power part of the system.

Figure 2:
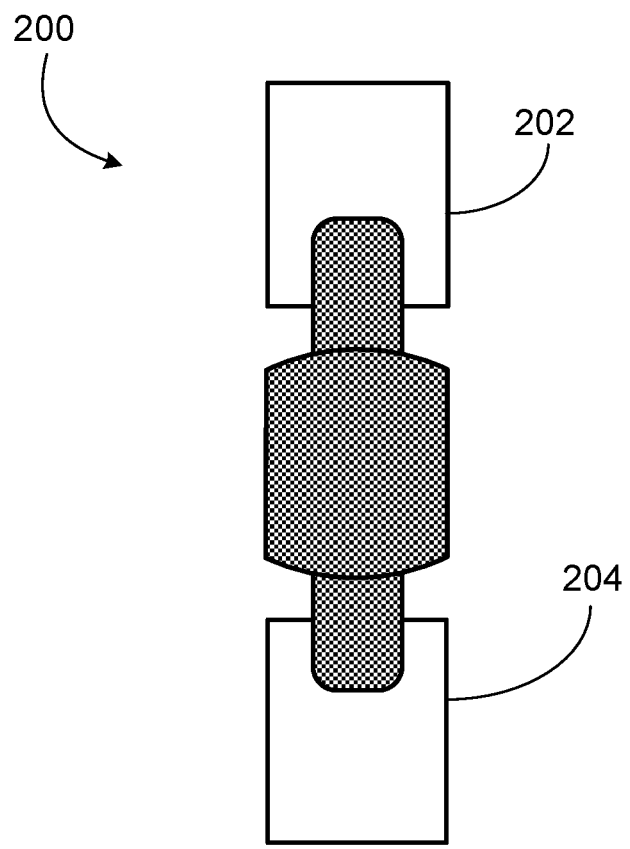
FIG. 2 is a schematic diagram illustrating the thermal transfer engine in accordance with one aspect of the disclosure.

FIG. 2 illustrates a Stirling engine 200 in accordance with one aspect of the disclosure. The Stirling engine 200 may comprise a first heat exchanger 202 or a heat receiver and a second heat exchanger or heat conductor 204. The first heat exchanger 202 may comprise a hot side of the Stirling engine 200. The second heat exchanger 204 may comprise a cold side of the Stirling engine 200. The cold side may be directly or otherwise connected to the cooling system 130, which will increase efficiency of the Stirling engine 220 while providing a beneficial byproduct.

Figure 3:
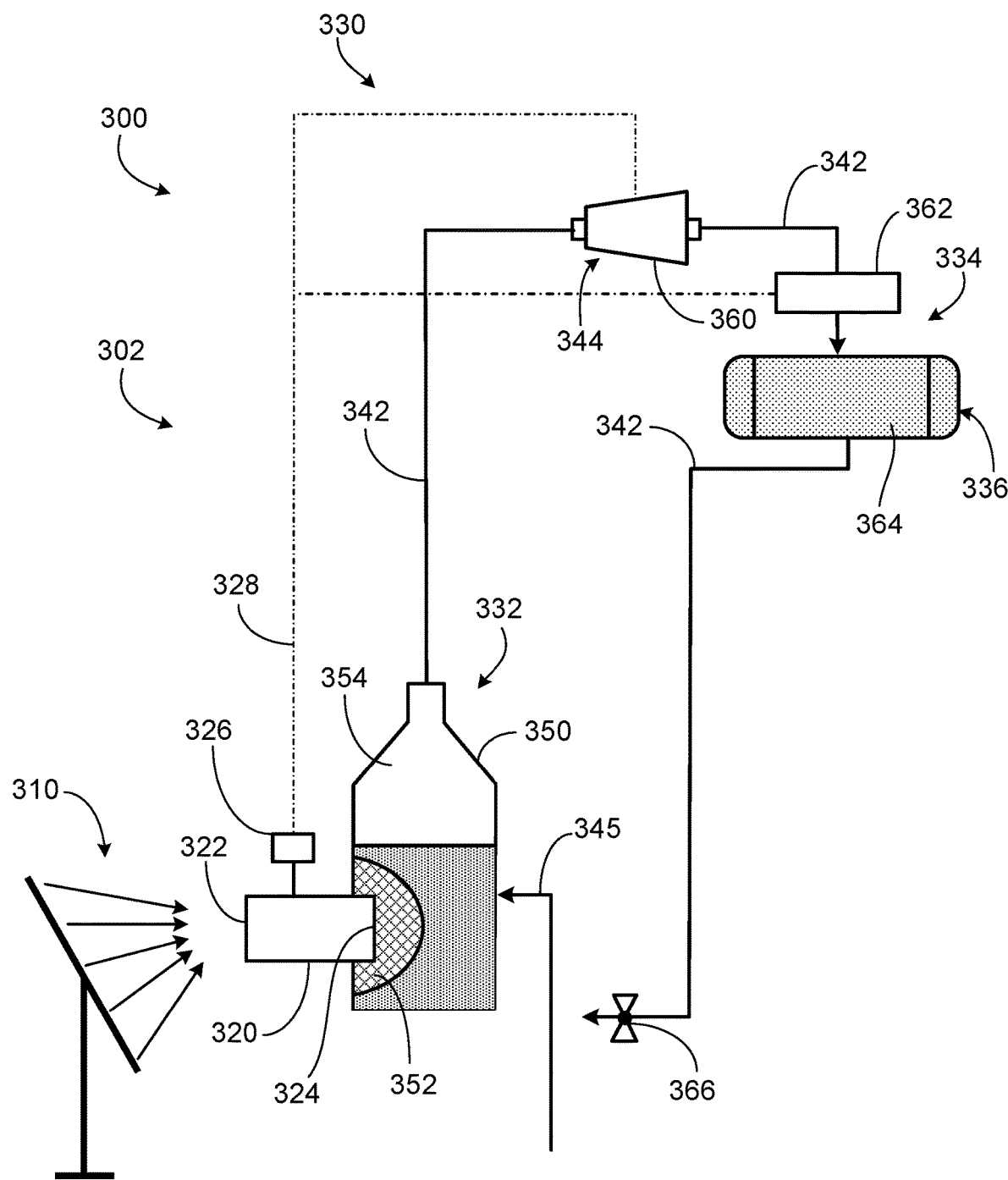
FIG. 3 is a schematic diagram illustrating a desalination plant using the thermal transfer engine and vacuum vapor compression (VVC) in accordance with one aspect of the disclosure.

FIG. 3 illustrates a thermal utilization or heat engine plant 300 in accordance with one aspect of the disclosure. In this aspect, the heat engine plant 300 is a desalination plant 302 that uses solar energy and vacuum vapor VC/vacuum vapor compression (VVC) to desalinate seawater and produce freshwater. The vacuum vapor compression (VVC) may be omitted in some embodiments. In other embodiments, non-solar energy may be used as the heat source.

Referring to FIG. 3, the desalination plant 302 comprises a solar reflector 310 as a heat source, a Stirling engine 320 as a heat engine, and a desalination system 330 as a cooling system. The solar reflector 310 collects or focuses energy from the sun onto hot side 322 of the Stirling engine. The solar reflector 310 may, for example, comprise a concentrated solar power (CSP) unit. Other non-carbon or other heat sources may be used in place of or with the solar collector.

The Stirling engine 320 receives heat from the solar reflector 310 and transfers the heat from the hot side 322 to the cold side 324 while producing mechanical energy or electrical energy. In the illustrated embodiment, the Stirling engine 320 comprises or is coupled to a generator 326 to generate electrical power 328 from the mechanical energy. The electrical power may be used to partially or fully power the desalination plant 302 or the desalination system 330, including a control systems having sensors and remotely controlled valves. In other embodiments, other types of power may be generated by the Stirling engine 320 for use in and/or outside of the desalination plant 302.

The desalination system 330 may comprise an evaporator 332, a vacuum system 344, a condenser 334, and a storage system 336. The evaporator 332, vacuum system 344, condenser 334, and storage tank 336 may be connected in sequence by conduit 342. As water is evaporated from seawater in the evaporator 332, fresh seawater 345 may be automatically or otherwise added continuously or periodically to the evaporator 332 to maintain the level of seawater in the evaporator 332.

The evaporator 332 may comprise one or more boilers 350 including a heat step down attachment 352. In another embodiment, the heat step down attachment 352 may be separate from the boiler 350 and/or part of the Stirling engine 320. The heat step down attachment 352 may step down the heat from the Stirling engine 320 to provide heat to a working fluid 354 in the boiler 350 at a at practical/safe temperature. For example, in a specific embodiment, the Stirling engine 320 may operate at 350 degrees Celsius. The heat step down attachment 352 may step down or reduce the temperature to, for example, 70 degrees Celsius to evaporate saline water such as seawater and produce steam in connection with a low pressure in the evaporator 332.

The heat step down attachment 352 may step down the heat to other suitable temperatures including temperatures at or over 100 degrees Celsius or other temperatures below 100 degrees Celsius, such as, for example, 90 degrees Celsius, 80 degrees Celsius, or 75 degrees Celsius. The heat step down attachment 352 may be sized and shaped and include materials to provide the desired conduction and/or transfer. The heat step down attachment 352 can be a solid heat conductor, a heat dispenser, a thermal fluid mixer or any other heat conduction and mix apparatus. A solid heat step down attachment may spread heat on a wide area or surface. The heat step down attachment 352 can be attached internally or externally, directly to the heat engine or via heat exchanger and fluid connections. The heat step down attachment 352 and heat engine 320 may together form a thermal transfer engine (TTE).

The pressure in the evaporator 332 may be any suitable pressure below atmospheric pressure. For example, the pressure may be at or below 10 psi, 8 psi, 6 psi, 5 psi, 4 psi, 3 psi or 2 psi. In one embodiment, the pressure and temperature of the boiler 350 may be together set or balanced to provide enhanced, preferred, or optimum evaporation of water from seawater. Optimization may be achieved by most efficiently evaporating water balanced with reducing or minimizing fouling of the evaporator 332.

The vacuum system 344 may comprise one or more vacuum pumps 360 in-line in the conduit 342. The vacuum pump 360 may comprise a turbine, a vapor pump, or other device operable to pull a vacuum on, provide vacuum vapor compression (VVC) or reduce the pressure in the evaporator 332 to below atmospheric pressure to move working fluid vapor in the conduit and/or allow the evaporator 332 to operate at below 100 degrees Celsius. The vacuum pump 360 may be powered by the generator 326, or directly by the heat engine 320 in a mechanical mean.

The condenser 334 may comprise one or more heat exchangers 362 operable to reject heat to condense the working fluid 354 from gaseous to liquid state. In one embodiment, the heat exchanger 362 is a series of coils and fans, such as a radiator. The condenser 334 may operate at the same or substantially the same pressure as the evaporator 332. The condenser 334 may be powered by the generator 326 or may passive or otherwise powered. The condenser can be used to pre heat seawater before entering the evaporators.

Condensed working fluid, or fresh water in the desalination embodiment, may be stored in one or more storage tanks 364 of the storage system 336. The storage tank 364 may be elevated above the Earth's surface, at ground level, or sunk below the Earth's surface. For example, where the desalination system 330 operates at a low pressure of 4 psi, the storage tanks 364 may be elevated at 33 feet, or more above the Earth to overcome the low pressure and allow fresh water to flow without a pump at a discharge at the Earth's surface, also we can use a dual pressure pump if we want to avoid relying on elevation. In another example, the storage tank 364 may be at or below ground level and a discharge pump used to discharge fresh water.

From the storage tanks 364, fresh water may be discharged via an output 366. The storage system 336 may in some embodiment be omitted and the fresh water directly used from the condenser 334.

Figure 4:
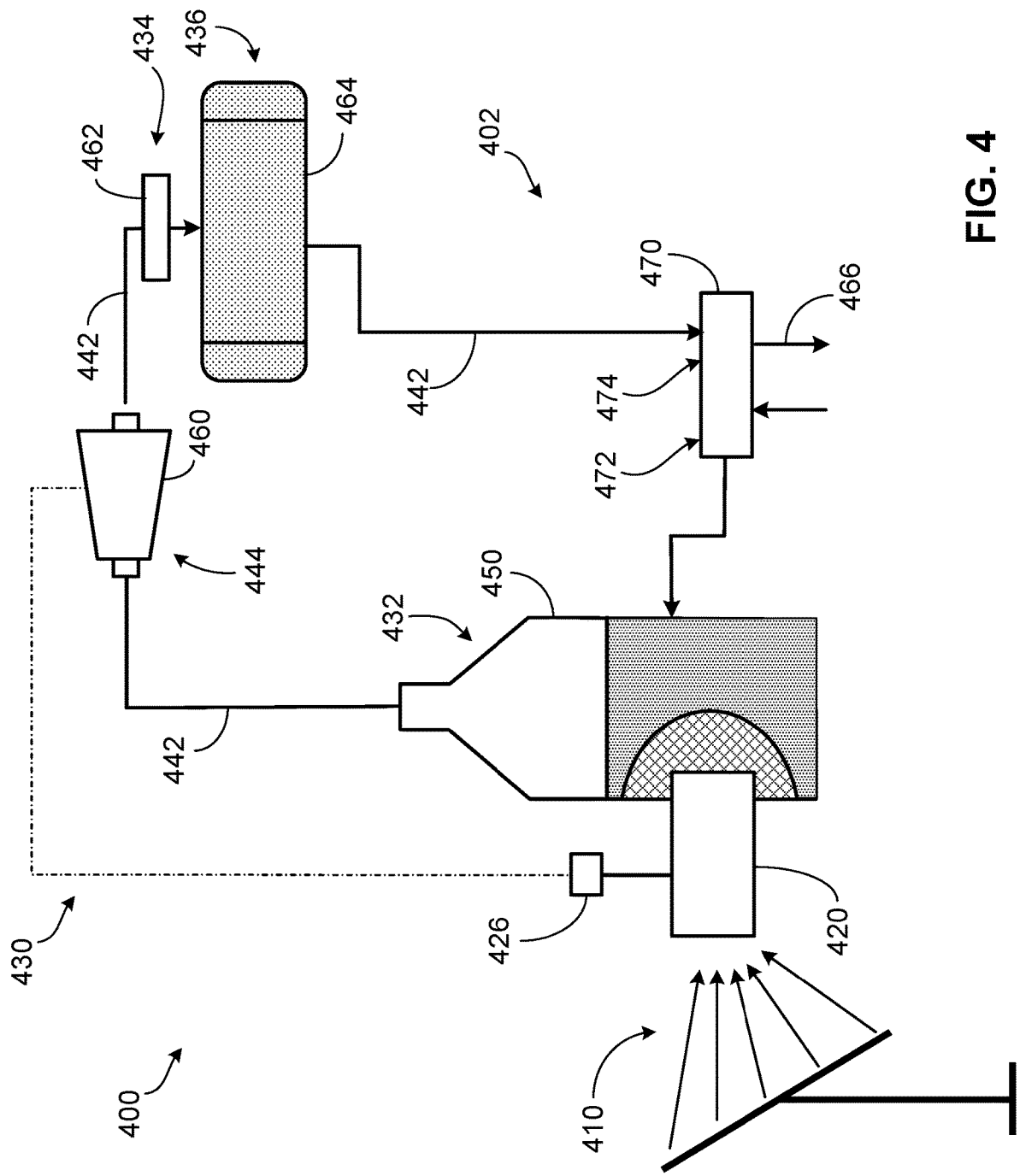
FIG. 4 is a schematic diagram illustrating a desalination plant using the thermal transfer engine and a dual pressure pump in accordance with an aspect of the disclosure.

FIG. 4 illustrates a heat engine plant 400 in accordance with one aspect of the disclosure. In this aspect, the heat engine plant 400 is a desalination plant 402 that uses solar energy and vacuum vapor compression (VVC) to desalinate seawater and produce freshwater. In addition, the desalination plant 402 uses a dual pressure pump to continuously inject fresh seawater into the desalination plant 402 and remove fresh water.

Referring to FIG. 4, the desalination plant 402 may comprise a solar reflector 410, a Stirling engine 420 with a generator 426, and a desalination system 430. The desalination system 430 may comprise an evaporator 432, a vacuum system 444, a condenser 434, and a storage system 436. The evaporator 432, vacuum system 444, condenser 434, and storage tank 436 may be connected in sequence by conduit 442. The evaporator 432 may be the same as or substantially similar to evaporator 332 and may be a boiler 350. Similarly, vacuum system 444 may be the same as or substantially similar to vacuum system 344 and comprise a turbine 460. The condenser 434 may be the same as or substantially similar to condenser 334 and comprise a heat exchanger 462. The storage system 436 may be the same as or substantially similar to storage system 336 and comprise a storage tank 464.

From the storage tank 464, fresh water may be discharged via a dual pressure pump 470 and output 466. The dual pressure pump is used when elevation is not preferred and in order to counter the system vacuum. The dual pressure pump 470 is a reciprocating pump with two chambers, four valves, and a four stage cycle. A first chamber 472 injects seawater into the desalination system 430 and a second chamber 474 removes fresh water from the desalination system 430. The dual pressure pump 470 may operate off a pressure difference between atmospheric pressure of 14.7 psi and the pressure of the desalination system 430 which may be under vacuum and operate at, for example, 4 psi or less. The dual pressure pump 470 may be otherwise operated or powered. In addition, other suitable pumps may be used, such as dual rotary pumps.

FIGS. 5A-D are schematic diagrams illustrating details of the dual pressure pump 470 in accordance with an aspect of the disclosure. The dual pressure pump 470 may comprise a piston that reciprocates to alternately compress a first chamber and a second chamber. After each compression stroke, all valves may be closed. The dual pressure pump 470 may use internal or external valves. In some embodiment, the dual pressure pump 470 may be used to save energy.

Figure 5A:
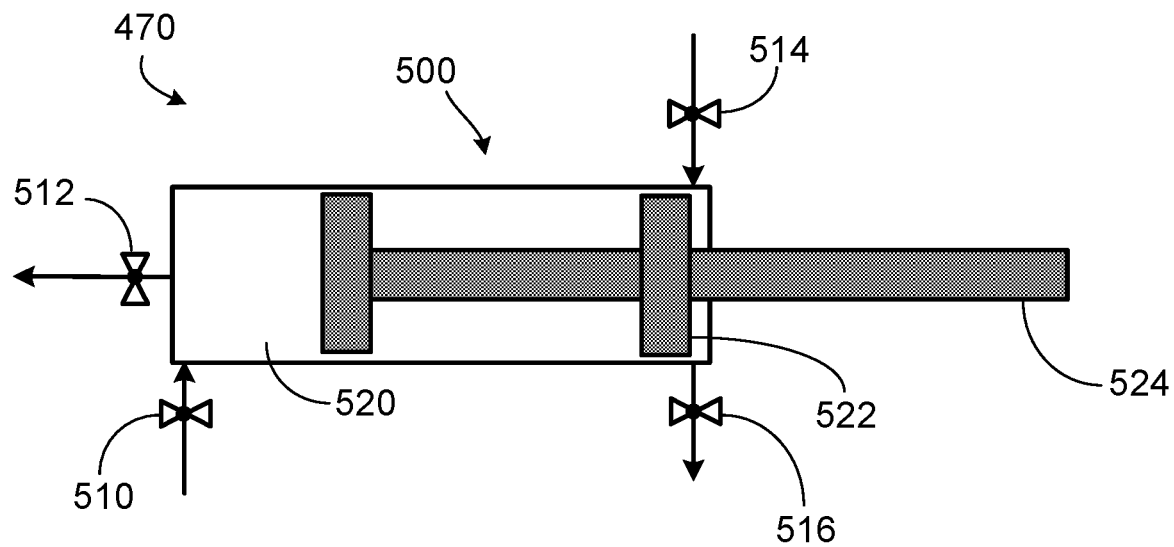
FIGS. 5A-D are schematic diagrams illustrating details of the dual pressure pump in accordance with an aspect of the disclosure.
Figure 5B:
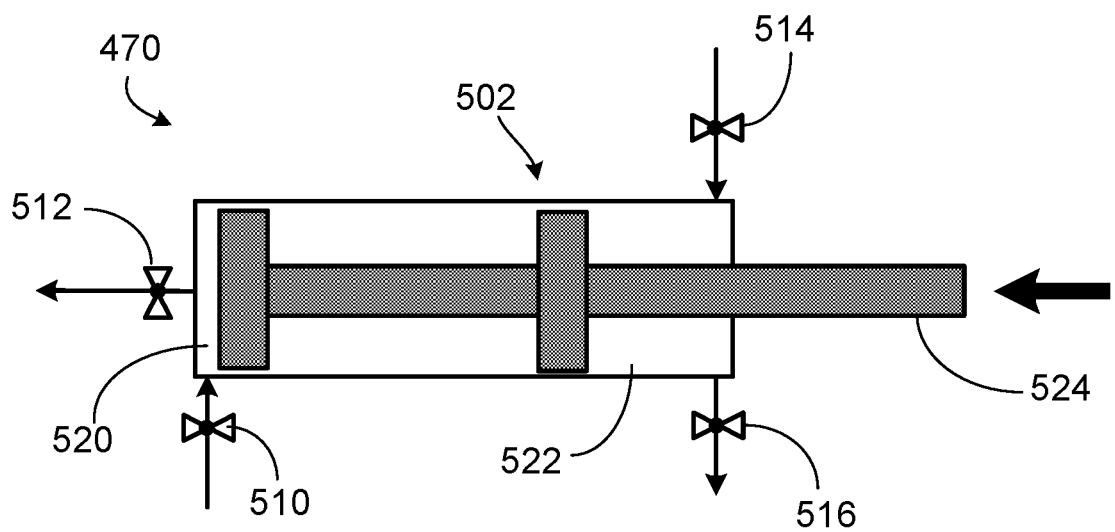
Figure 5C:
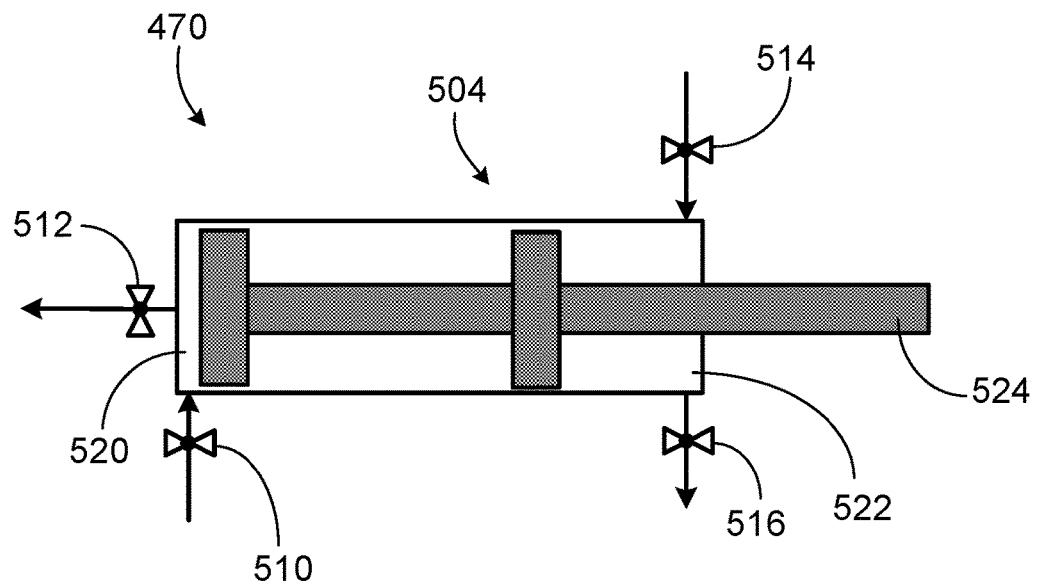
Figure 5D:
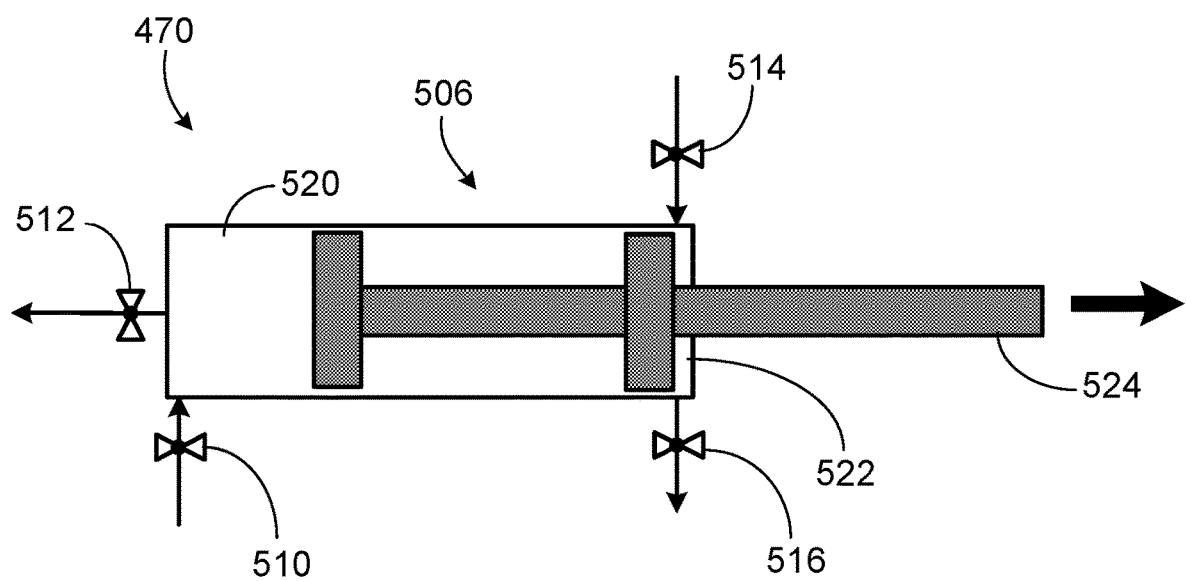

In particular, at a first stage all the valves may be closed. At a second stage the valves may be set for a forward compression stroke as illustrated in FIG. 5A. The third stage may be the forward compression stroke as illustrated by FIG. 5B. All the valves may again be closed at the fourth stage. At the fifth stage the valves may be set for a backward compression stroke as illustrated in FIG. 5C. The sixth stage may be the backward compression stroke as illustrated by FIG. 5D. In this embodiment, the desalination system may operate under vacuum of 4 psi or less. Other suitable pressures may be used in connection with the dual pressure pump 470.

Referring to FIG. 5A, the dual pressure pump 470 is in the second stage 500. At the first stage, all the pump valves were closed. In the second stage 500, a seawater inlet valve 510 is closed, a seawater outlet valve 512 (which is connected to and provides seawater to the evaporator) is open, a freshwater inlet valve 514 (which is connected to and receives fresh water from the storage tank is open, and a fresh water outlet valve 516 (which is connected to and provides freshwater to the output) is closed.

Referring to FIG. 5B, the dual pressure pump 470 is in the third stage 502. In this stage, a first, or seawater, chamber 520 is emptied and a second, or freshwater, chamber 522 is filled. A piston 524 is moved from a first position shown in FIG. 5A to a second position shown in FIG. 5B. As the piston moves, seawater is pumped from the first chamber 520 through the seawater outlet valve 512 to the evaporator, while fresh water is pulled into the second chamber 522 from the storage tank.

Referring to FIG. 5C, the dual pressure pump 470 is in the fifth stage 504. At the fourth stage all the pump valves were closed. In the fifth stage 502, the valves are opposition the settings of the second stage. Thus, the seawater inlet valve 510 (which is connected to a seawater source) is opened, the seawater outlet valve 512 is closed, the freshwater inlet valve 514 is closed, and the fresh water outlet valve 514 is opened.

Referring to FIG. 5D, the dual pressure pump 470 is in the sixth stage 506. In this stage, a first, or seawater, chamber 520 is filled and a second, or freshwater, chamber 522 is emptied. The piston 524 is moved from the second position shown in FIG. 5C to the first position shown in FIG. 5D. As the piston 524 moves, seawater is pulled into the first chamber 520 through the seawater inlet valve 510 from the seawater source while fresh water is pumped from the second chamber 522 to an outlet. As the dual pressure pump 460 operates, the cycle is repeated.

Figure 6:
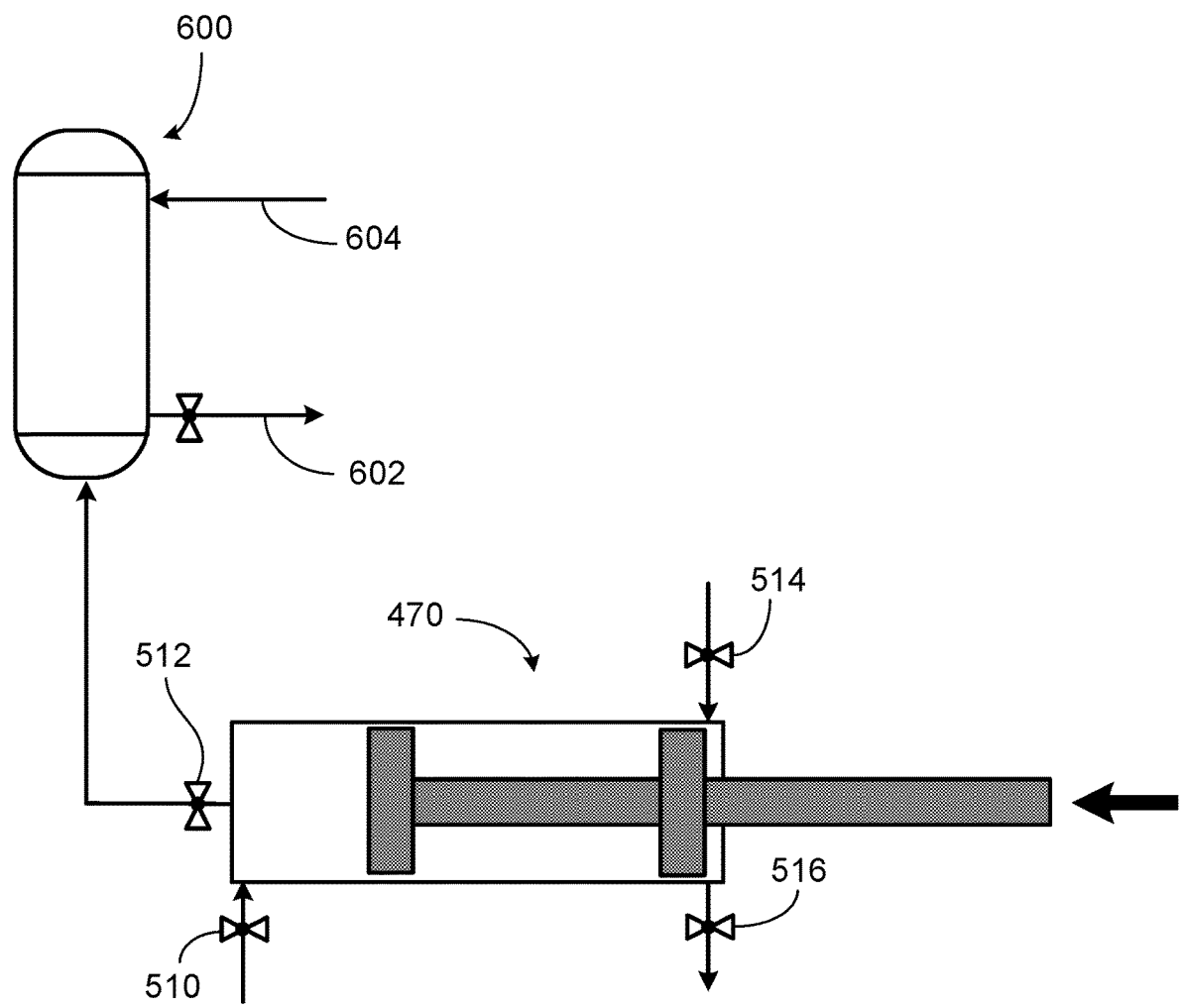
FIG. 6 is a schematic diagram illustrating a cleaning system for an evaporator of a desalination plant in accordance with an aspect of the disclosure.

FIG. 6 is a schematic diagram illustrating a cleaning system for an evaporator of a desalination plant in accordance with an aspect of the disclosure. In this aspect, saturated seawater remaining from evaporation may be removed and replaced with fresh seawater. The dual pressure pump 470 or other pump may be used to remove the saturated seawater and replace with fresh seawater.

Referring to FIG. 6, the dual pressure pump 470 is used with a holding tank 600. The holding tank 600 has an evaporator fill line 602 and evaporator return line 604. The seawater outlet valve 512 of the dual pressure pump 470 is disconnected from the evaporator and connected instead to the holding tank 600 so that the holding tank will be filled rather than the evaporator during the cleaning process. In addition, the freshwater inlet valve 514 is disconnected from the storage tank and instead connected to the evaporator to remove saturated seawater. The fresh water outlet valve 514 is disconnected from the fresh water outlet and connected to a saturated seawater outlet. The dual pressure pump valves and piston is operated as described in connection with FIGS. 5A-D to pump out the saturated seawater and fill the holding tank 600 with fresh seawater.

After the evaporator is empty or pumped down to a desired level, the dual pressure pump may be reconnected for normal operation and the evaporator filled with fresh seawater from the holding tank. The dual pressure pump may be reconnected and disconnected by turning valves or by physically disconnecting the pumps inputs and outputs. Saturated seawater may be otherwise removed from the evaporator and the evaporator otherwise filled with fresh seawater. For example a second dual pressure or other pump may be used.

Figure 7:
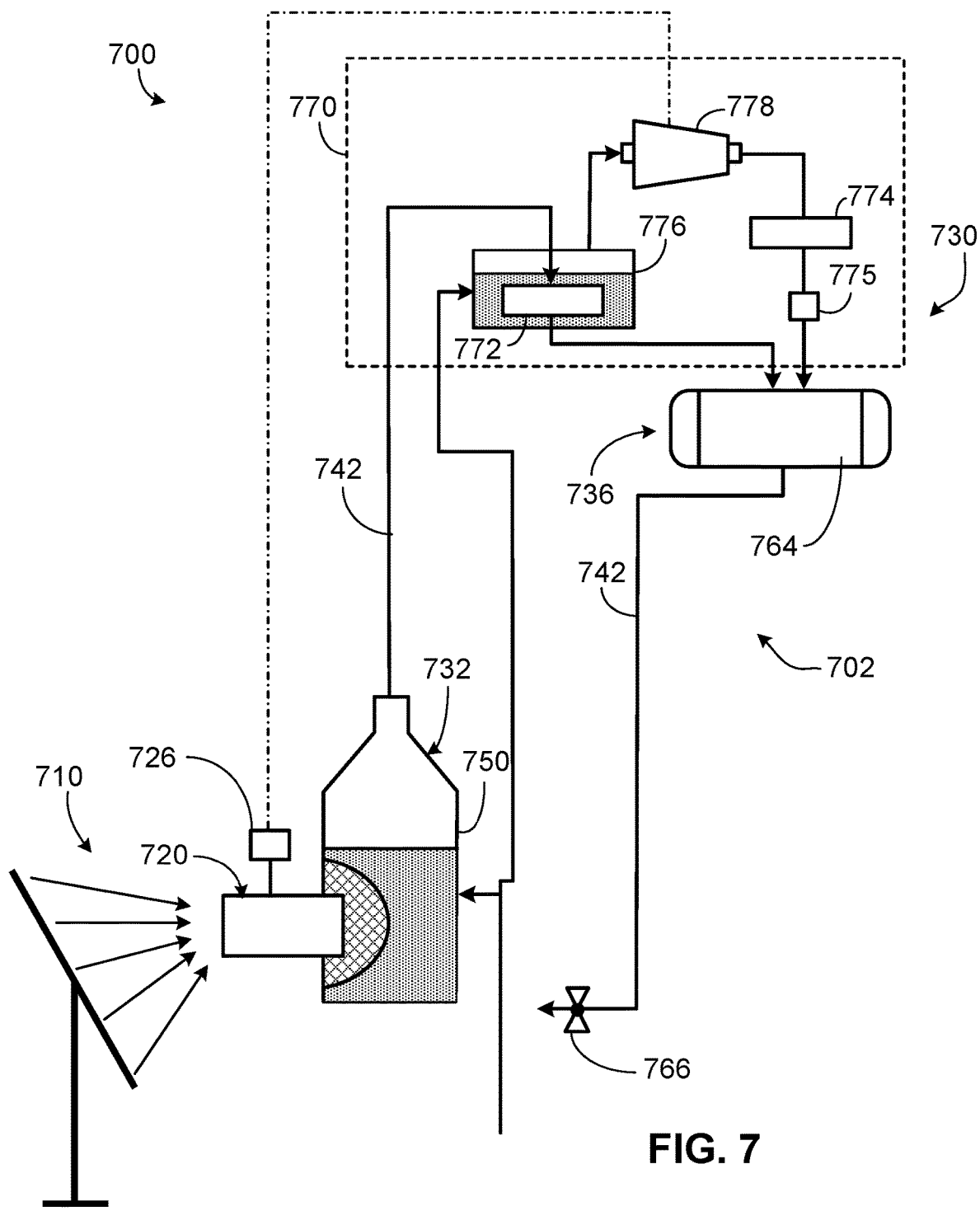
FIG. 7 is a schematic diagram illustrating a desalination plant using the thermal transfer engine and vacuum vapor compression (VVC) in accordance with another aspect of the disclosure.

FIG. 7 illustrates a heat engine plant 700 in accordance with one aspect of the disclosure. In this aspect, the heat engine plant 700 is a desalination plant 702 that uses solar energy and single effect distillation with vacuum vapor compression (VVC) to desalinate seawater and produce freshwater. In some embodiments, vacuum vapor compression (VVC) may be omitted. For example, vacuum vapor compression (VVC) may be omitted where electrical energy is needed more than fresh water or if the electrical power is to be used for reverse osmoses. The vacuum pump 778 can be used between the evaporator 732 and the condenser 772 instead of the location showing in FIG. 7.

Referring to FIG. 7, the desalination plant 702 may comprise a solar reflector 710, a Stirling engine 720 with a generator 726, and a desalination system 730. The desalination system 730 may comprise an evaporator 732 and a storage system 736. The evaporator 732 and storage tank 736 may be connected in sequence or otherwise coupled by conduit 742. The evaporator 732 may be the same as or substantially similar to evaporator 332 and be a boiler 750. The storage system 736 may be the same as or substantially similar to storage system 336 and comprise a storage tank 764.

A single effect distillation system 770 is coupled between the evaporator 732 and the storage system 736 and comprises vacuum system and condenser elements connected or otherwise coupled together with conduit 742. In the illustrated embodiment, the single effect distillation system 770 comprises a first condenser and a second condenser 774. Each condenser 772 and 774 may comprise a heat exchanger. Condensed water is output by each condenser 772 and 774 to the storage tank 764. A pressure control 775 may control pressure at the outlet of the condenser 774 downstream of the vacuum pump 778. The pressure control may be, for example, a pressure regulator or pressure reduction valve.

The first condenser 772 is contained in a second evaporator 776. Instances of a condenser contained in an evaporator may be implemented as a single heat exchanger. The second evaporator 776 uses heat from the heat exchanger of the first condenser 772 in connection with a vacuum or low pressure to evaporate seawater in second evaporator 776. The second evaporator 776 may operate at the same, similar, or different pressures and temperatures as the evaporator 732.

The low pressure may be provided by a vacuum pump 778 coupled between the second evaporator 776 and the second condenser 774. The vacuum pump may be a turbine. Water vapor from the second evaporator 776 flows through the vacuum pump 778 to the second condenser 774 where it is condensed.

Figure 8:
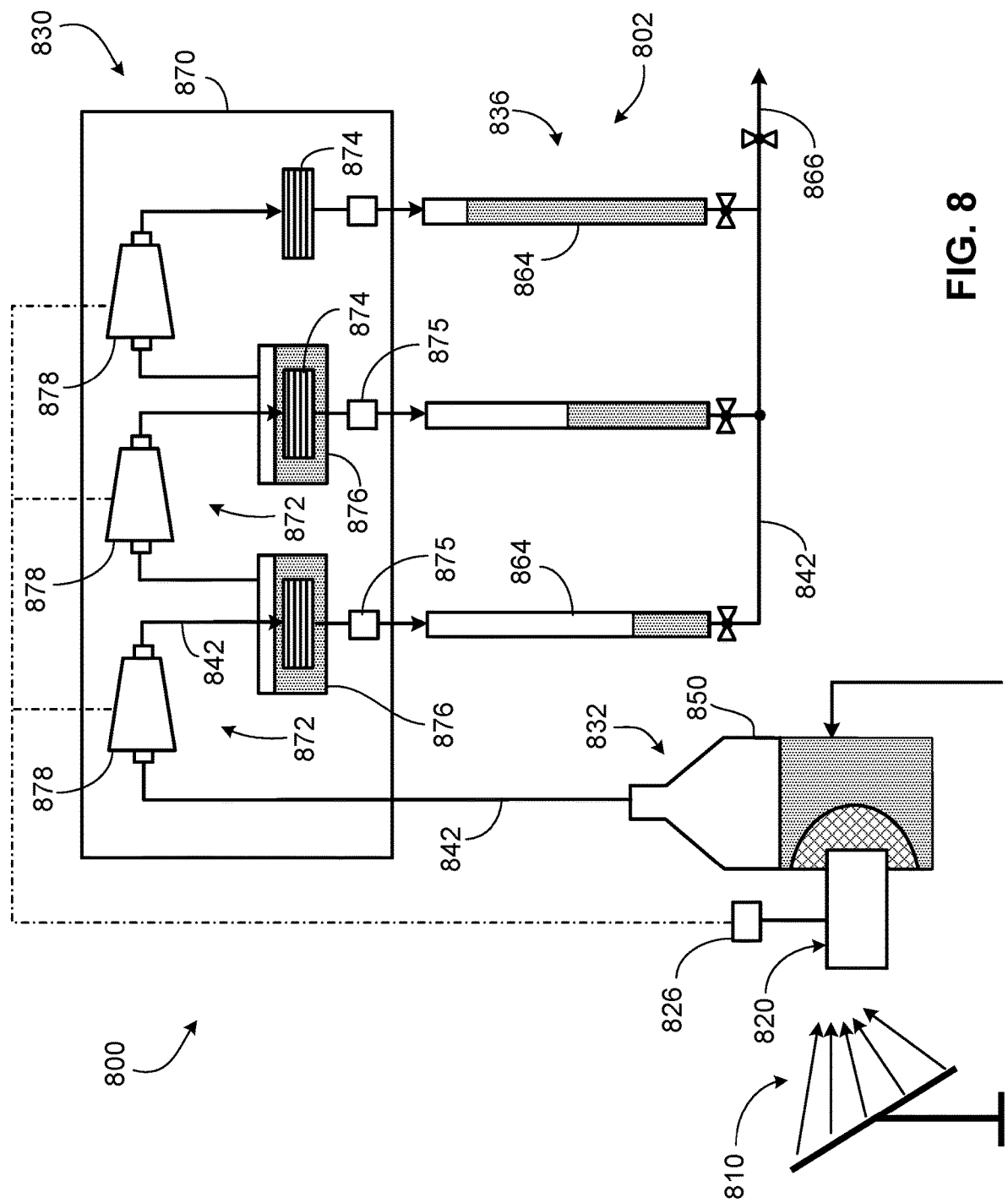
FIG. 8 is a schematic diagram illustrating a desalination plant using the thermal transfer engine and multi effect desalination (MED) and vacuum vapor compression (VVC) in accordance with another aspect of the disclosure.

FIG. 8 illustrates a heat engine plant 800 in accordance with one aspect of the disclosure. In this aspect, the heat engine plant 800 is a desalination plant 802 that uses solar energy and multiple effect distillation with vacuum vapor compression (VVC) to desalinate seawater and produce freshwater. In some embodiments, as described above, vacuum vapor compression (VVC) may be omitted.

Referring to FIG. 8, the desalination plant 802 may comprise a solar reflector 810, a Stirling engine 820 with a generator 826, and a desalination system 830. The desalination system 830 may comprise an evaporator 832 and a storage system 836. The evaporator 832 and storage system 836 may be coupled in sequence or otherwise by conduit 842. The evaporator 832 may be the same as or substantially similar to evaporator 332 and be a boiler 850. The storage system 836 may be the same as or substantially similar to storage system 336 and comprise one or more storage tanks 864. In the illustrated embodiment, a plurality of vertical storage tanks or elevated tanks are used. The heights of a water column or elevation of the vertical tanks may be increased after each stage. The vertical tanks may be used, for example, to counter the vacuum.

A multiple effect distillation system 870 is coupled between the evaporator 832 and the storage system 836 and may comprise vacuum system and condenser elements connected or otherwise coupled together with conduit 842. In the illustrated embodiment, the multiple effect distillation system 870 comprises a plurality of stages 872 together having a plurality of condensers 874 and a plurality of evaporators 876. Each stage may have at least one condenser 874 and a plurality of stages may have at least one evaporator 876 containing at least one condenser 874. The evaporator 876 in a stage may be coupled to a condenser 874 of a next stage 872 by the vapor conduit 842. Pressure may be reduced after every step. A pressure control 875 may control pressure at the outlet of the each condenser 874 downstream of a vacuum pump 878. The pressure control may be, for example, a pressure regulator or a pressure reduction valve.

The condensers 874 may each comprise a heat exchangers. The evaporators 876 may each use heat from the corresponding or contained heat exchanger in connection with a vacuum or low pressure to evaporate seawater. The seawater in the evaporators of the multiple effect distillation system 870 may be replenished and cleaned when saturated as described for the evaporator 832. The evaporators 876 may operate at the same, similar, or different pressures and temperatures from each other and/or as the evaporator 832.

The low pressure may be provided by one or more vacuum pump 878 coupled between an evaporator 876 in a stage and a condenser in the next stage. The vacuum pump 878 may be a turbine. The vacuum pumps 878 for this and other embodiments may create additional heat in addition to pressure in a downstream condenser that may in turn aid evaporation of a downstream evaporator. A step down attachment may be used in the multiple effect distillation system 870. Water vapor from the evaporators 876 flows through the vacuum pumps 878 to the condensers 874 where it is condensed.

Figure 9:
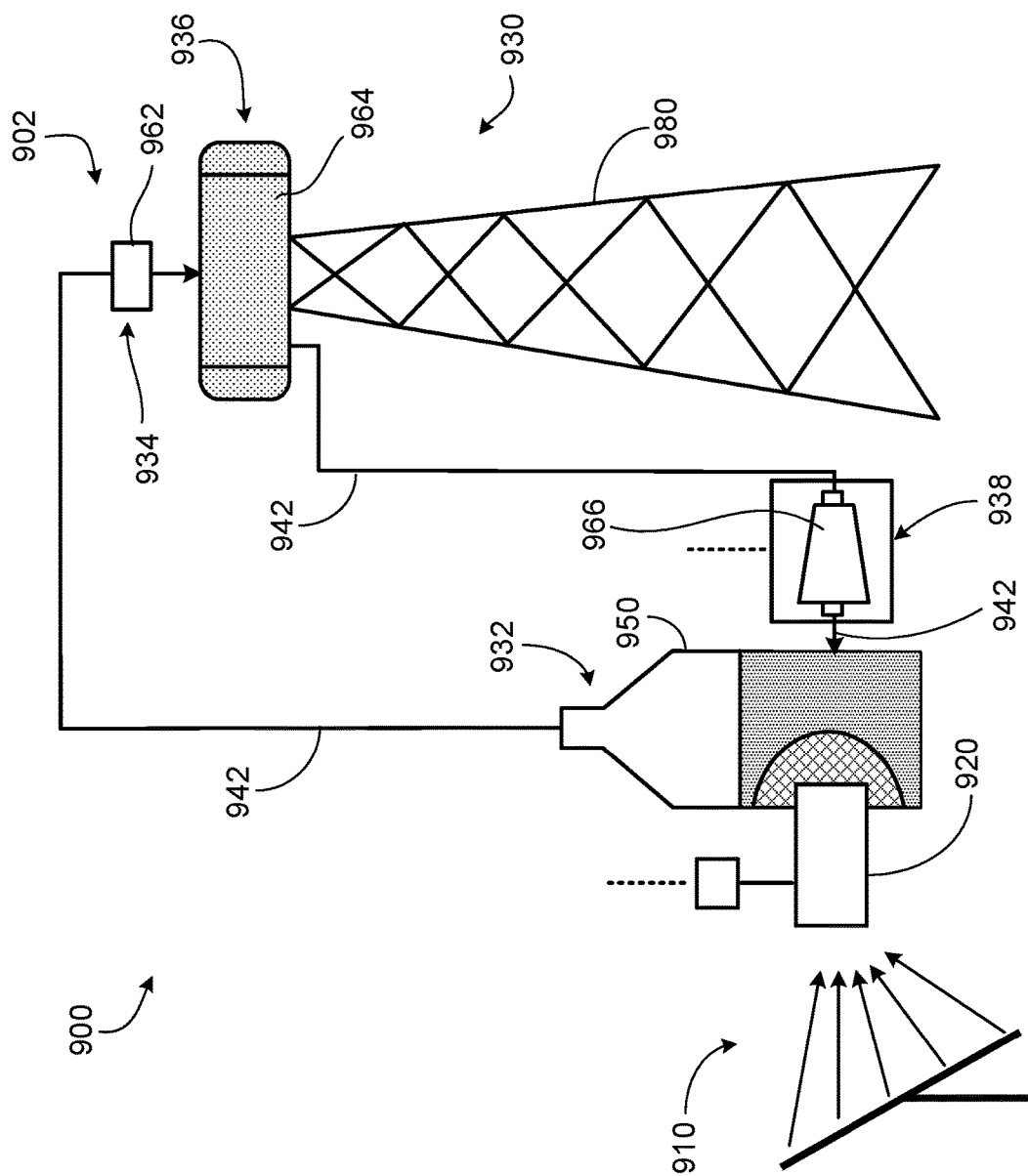
FIG. 9 is a schematic diagram illustrating a power generation plant using the thermal transfer engine in accordance with one aspect of the disclosure.

FIG. 9 illustrates a heat engine plant 900 in accordance with one aspect of the disclosure. In this aspect, the heat engine plant 900 is a power generation plant 902 that uses solar energy to generate power with a heat engine and with a moving working fluid.

Referring to FIG. 9, the power generation plant 902 may comprise a solar reflector 910, a Stirling engine 920 with a generator 926, external or internal and a power generation system 930. The power generation system 930 may comprise an evaporator 932, a condenser 934, a storage system 936, and a generator stage 938. The evaporator 932, condenser 934, storage system 936, and generator stage 938 may be connected in sequence or otherwise by conduit 942. The evaporator 932 may be the same as or substantially similar to evaporator 332 and be a boiler 950. The condenser 934 may be the same as or substantially similar to condenser 334 and comprise a heat exchanger 962. The storage system 936 may be the same as or substantially similar to storage system 336 and comprise a storage tank 964.

The generation stage 938 may comprise one or a plurality of power generators connected or otherwise coupled together. The generation stage 938 is configured to generate power using flowing working fluid, such as with a turbine 966. The working fluid flows or falls through the turbine 966 from the storage tank 964 to the boiler 950.

The working fluid may comprise a refrigerant, such as a fluorocarbon, non-halogenated hydrocarbons, and other suitable fluids. As previously described, the refrigerant may have favorable thermodynamic properties, be noncorrosive to mechanical components, and be safe, including free from toxicity and flammability and not cause ozone depletion or climate change. The refrigerant may be lifted and condensed at an elevated height and then recirculated losslessly. Thus, the condenser and the storage tank 964 may be positioned on an elevated structure 980 or natural hill. Such an elevated structure 980 may also be used in the desalination embodiments for positioning the storage tank at an elevated height. In this method with some substances pressure may not be needed.

Figure 10:
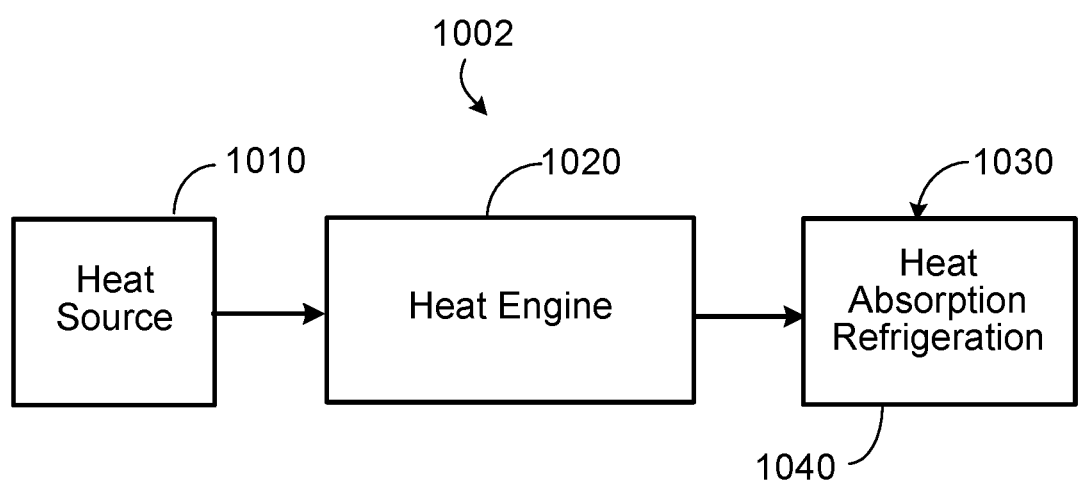
FIG. 10 is a schematic diagram illustrating a cooling plant using the thermal transfer engine in accordance with one aspect of the disclosure.

FIG. 10 is a schematic diagram illustrating a heat engine plant 1000 in accordance with one aspect of the disclosure. In this aspect, the heat engine plant 1000 is a cooling plant 1002 that uses solar or other energy.

Referring to FIG. 10, the cooling plant 1002 may comprise a heat source 1010, a heat engine 1020 such as a Stirling engine, and a cooling system 1030. The cooling system 1030 may provide heat absorption refrigeration 1040 that can be done by transfer solar energy or waste heat via a Stirling engine to the heat absorption refrigeration evaporator. In one embodiment, a step down attachment may be used. The heat absorption refrigeration evaporator may use a refrigerant, including a refrigerant with a low boiling point. As the refrigerant boils in the heat absorption refrigeration evaporator, the refrigerant may take heat with it and thus provide cooling.

Figure 11:
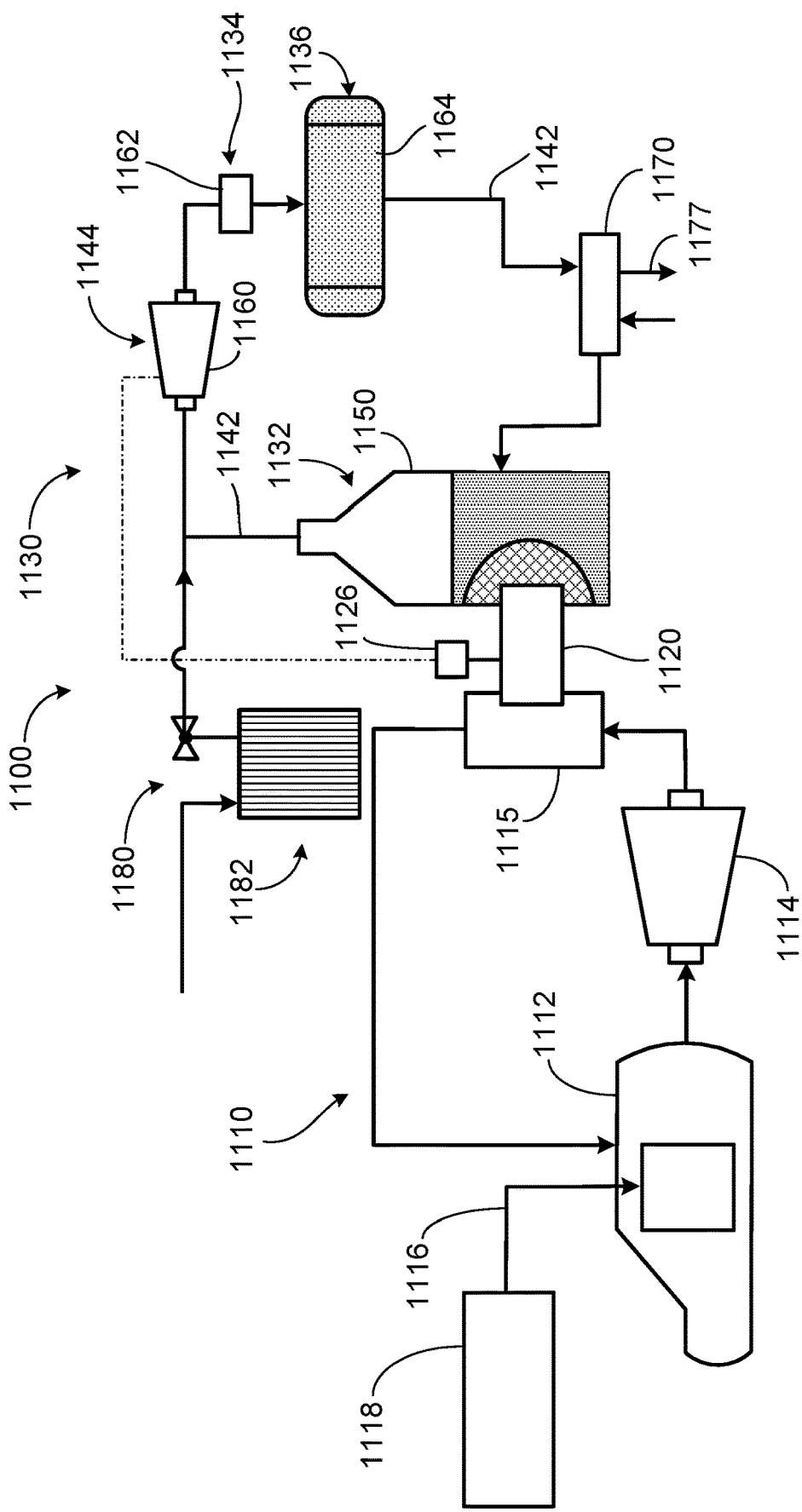
FIG. 11 is a schematic diagram illustrating a multipurpose plant using the thermal transfer engine in accordance with one aspect of the disclosure.

FIG. 11 is a schematic diagram illustrating a combined plant 1100 using the thermal transfer engine in accordance with one aspect of the disclosure. In this aspect, a heat source drives a heat engine which provides cooling for an industrial process while providing heat and cooling as well as desalination and power generation. It will be understood that one or more of the beneficial processes may be omitted.

Referring to FIG. 11, a heat source 1110 may comprise a steam turbine cycle comprising a boiler 1012, a turbine 1114, and a heat exchanger and/or condenser 1115. The boiler 1112 of the steam turbine cycle may receive waste heat 1116 from a combustion engine 1118. The combined plant 1100 may comprise a Stirling or other heat engine 1120 with a generator 1126. The Stirling engine 1120 is coupled to multipurpose desalination system 1130. The multipurpose desalination system 1130.

The multipurpose desalination system 1130 may comprise an evaporator 1132, a vacuum system 1144, a condenser 1134 and a storage system 1136. The evaporator 1132, vacuum system 1144, condenser 1134 and storage tank 1136 may be connected in sequence or otherwise by conduit 1142. The evaporator 1132 may be the same as or substantially similar to evaporator 332 and have a boiler 1150. Similarly, vacuum system 1144 may be the same as or substantially similar to vacuum system 344 and comprise a turbine 1160. The condenser 1134 may be the same as or substantially similar to condenser 334 and comprise a heat exchanger 1162. The storage system 1136 may be the same as or substantially similar to storage system 336 and have a storage tank 1164. A dual pressure pump 1170 with fresh water output 1177 may be connected and operate as described in connection with dual pressure pump 470.

Heating may be provided by the heat exchanger 1162. Heat rejected or removed from the working fluid during condensation may be used in a heating conduit or the like. Cooling may be provided by a cooling system 1180 coupled to the vacuum pump 1160. The cooling system 1180 may comprise an external evaporator 1182 that provides cooling to a circulating fluid. Thus, fresh water, electrical and/or mechanical power, heating and cooling may all be provided and may be powered by solar energy, other non-carbon energy such as waste heat or other source.

Figure 12:
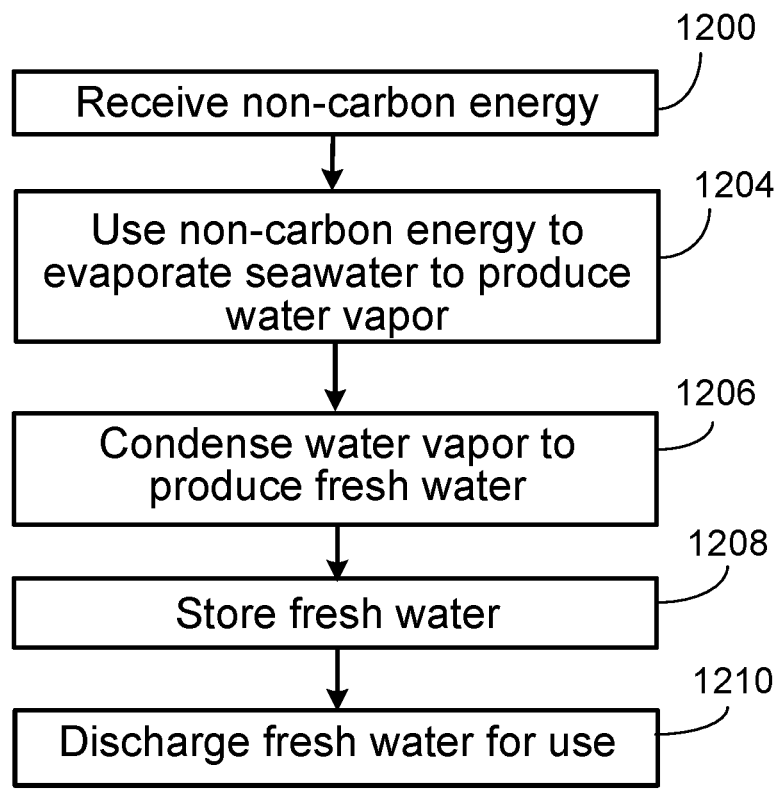
FIG. 12 is a flow chart illustrating a method for desalinating seawater using the thermal transfer engine in accordance with one aspect of the disclosure.

FIG. 12 is a flow chart illustrating a method for desalinating seawater using the thermal transfer engine in accordance with one aspect of the disclosure. One or more steps may be omitted or performed in a differ order. Additional steps may be added without departing from the scope of the present invention.

Referring to FIG. 12, the method begins at step 1200 in which non-carbon energy is received. As previously described, the non-carbon energy may comprise solar energy or waste heat or. Next, at step 1204, the non-carbon energy is used to evaporate seawater to produce water vapor. At step 1206, water vapor is condensed to produce fresh water. The freshwater stored at step 1208. In other embodiments, the freshwater may be directly discharged without storage. At step 1210, the freshwater may be discharge for use as drinking water, irrigation water or for other suitable uses.

Figure 13:
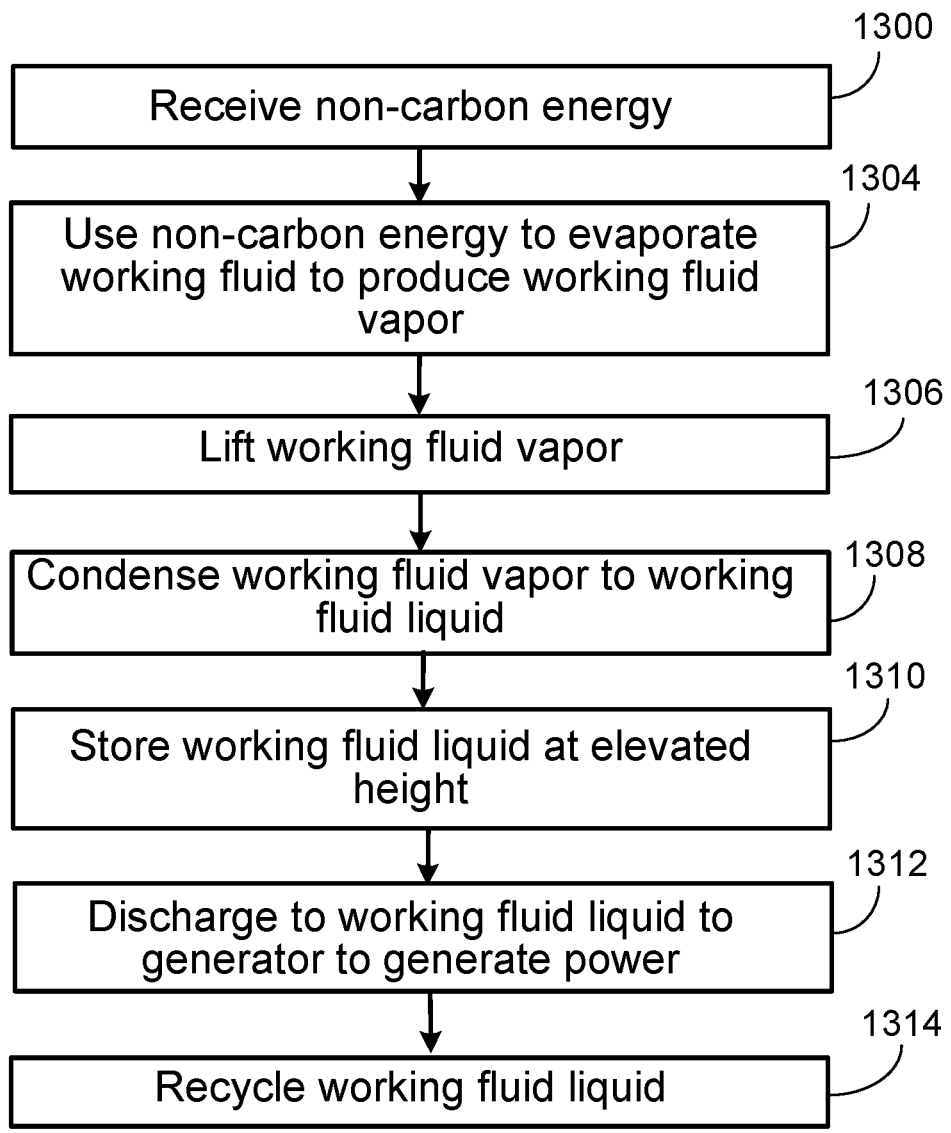
FIG. 13 is a flow chart illustrating a method for generating power using the thermal transfer engine in accordance with one aspect of the disclosure.

FIG. 13 is a flow chart illustrating a method for generating power using the thermal transfer engine in accordance with one aspect of the disclosure. One or more steps may be omitted or performed in a differ order. Additional steps may be added without departing from the scope of the present invention.

Referring to FIG. 13, the method begins at step 1300 in which non-carbon energy is received. As previously described, the non-carbon energy may comprise solar energy or waste heat. Next, at step 1304, the non-carbon energy is used to evaporate a working fluid. As previously described, the working fluid may comprise a refrigerant such as a fluorocarbon. At step 1306, working fluid vapor may be lifted to an elevated height, we do not need elevation if dual pressure pump used. At step 1308, the working fluid vapor is condensed to a working fluid liquid. The working fluid liquid at step 1310. In other embodiments, the working fluid liquid may be directly used without storage. At step 1312, the working fluid liquid may be discharged to a generator to generate power. The working fluid may be recycled in a closed loop at step 1314.

A number of embodiments of the invention have been described. Nevertheless, it will be understood that various modifications may be made without departing from the spirit and scope of the invention. Accordingly, other embodiments are within the scope of the following claims.

What is claimed is:

1. A desalination system, comprising:
an evaporator configured to vaporize a working fluid to a vapor state;
a heat engine coupled to the evaporator, the heat engine operable to receive heat from a non-carbon heat source and to transfer heat to the evaporator to vaporize the working fluid into the vapor state, the evaporator configured to cool the heat engine using the working fluid in the vapor state, the working fluid comprising water desalinated from seawater and to generate energy using the heat from the non-carbon heat source, the vaporized working fluid comprising water vapor;
a heat step down attachment coupled between the heat engine and the evaporator, the heat step down attachment operable to be heated to a first temperature responsive to receiving the heat from the heat engine and to reduce a quantity of the received heat to a second temperature lower than the first temperature, wherein the evaporator is configured to vaporize the working fluid to the vapor state at the second temperature;
a pump coupled to the evaporator by a conduit, the pump configured to reduce pressure of the vaporized working fluid, wherein the heat engine is coupled to the pump, wherein the pump is powered by the energy generated by the heat engine;
a condenser coupled to the pump by the conduit, the condenser operable to receive the water vapor the evaporator through the conduit and to condense the water vapor to fresh water in a fluid state; and an output coupled to the condenser, the output operable to receive the fresh water from the condenser and to provide the fresh water for use.

2. The system of claim 1, the heat engine comprising a Stirling engine, the Stirling engine configured to transfer heat between the heat source and the evaporator and to generate power, wherein the heat step down attachment is attached directly to the Stirling engine.

3. The system of claim 1, the non-carbon heat source comprising a solar reflector.

4. The system of claim 1, the non-carbon heat source comprising waste heat from an industrial process.

5. The system of claim 2, further comprising a dual pressure pump, the system further comprising:
a storage tank operable to store the fresh water, the storage tank coupled between the condenser and the output; and
wherein the dual pressure pump is coupled to the evaporator, a seawater source, the output and a fresh water discharge, the dual pressure pump powered by the Stirling engine and operable to provide seawater to the evaporator and to discharge fresh water from the storage tank.

6. The system of claim 2, further comprising a discharge pump, the system further comprising:
a storage tank operable to store the fresh water, the storage tank coupled between the condenser and the output; and
wherein the discharge pump is coupled to the storage tank to discharge fresh water from the storage tank, the discharge pump powered by the Stirling engine.

7. The system of claim 2, wherein the pump is a vacuum pump powered by the Stirling engine and operable to reduce pressure in the evaporator to aid evaporation.

8. The system of claim 1, further comprising a storage tank operable to store the fresh water, the storage tank coupled between the condenser and the output, the storage tank elevated at least 25 feet above the Earth's surface.

9. The system of claim 2, further comprising:
a second evaporator containing the condenser, the second evaporator operable to aid condensation of the water vapor in the condenser; and
a storage tank operable to store the fresh water, the storage tank coupled between the condenser and the output.

10. The system of claim 9, further comprising:
a vacuum pump coupled between the second evaporator and a second condenser, the vacuum pump powered by the Stirling engine and operable to reduce pressure in the second evaporator to aid condensation of the fresh water in the condenser;
the second condenser operable to condense water vapor from the second evaporator and provide the water to the storage tank; and
a pressure control coupled to the second condenser and the storage tank to control pressure in the second condenser.

11. The system of claim 9, further comprising:
a vacuum pump coupled in-line to the conduit, the vacuum pump powered by the Stirling engine and operable to reduce pressure in the evaporator to aid evaporation; and
a pressure control coupled between the condenser and the storage tank to control pressure in the condenser.

12. The system of claim 2, further comprising:
a multiple effect distillation system comprising a plurality of stages; the plurality of stages together comprising a plurality of condensers including the condenser and a plurality of evaporators; each of the plurality of stages comprising at least one condenser;
one or more of the plurality of stages comprising at least one evaporator containing at least one condenser, the evaporator in a stage coupled to a condenser of a next stage by a conduit; each evaporator operable to aid condensation of water vapor in the contained condenser; and each condenser comprising an output coupled to one or more storage tanks for storing fresh water.

13. The system of claim 12, further comprising one or more vacuum pumps, each vacuum pump coupled in-line between two stages, the vacuum pump powered by the Stirling engine and operable to reduce pressure in an evaporator to aid condensation in a contained condenser.

14. The system of claim 2, wherein the heat step down attachment is a solid heat conductor comprising a surface, wherein the heat step down attachment is configured to spread heat on the surface.

15. The system of claim 1, wherein the heat engine operates at a temperature of about 350 degree Celsius, wherein the heat step down attachment is configured to cool the heat engine to a temperature of between 70 degree Celsius and 100 degree Celsius.

16. The system of claim 1, wherein the heat step down attachment is entirely attached internally to the heat engine.

17. A power generation system, comprising:
an evaporator configured to vaporize a working fluid to a vapor state, the evaporator comprising a boiler within which the working fluid is configured to be vaporized;
a heat engine coupled to the evaporator, the heat engine operable to receive heat from a non-carbon heat source and to transfer heat to the evaporator to vaporize the working fluid into the vapor state, the evaporator configured to cool the heat engine using the working fluid in the vapor state, the heat engine configured to generate energy using the heat from the non-carbon heat source;
a heat step down attachment coupled between the heat engine and the evaporator, the heat step down attachment operable to be heated to a first temperature responsive to receiving the heat from the heat engine and to reduce a quantity of the heat to a second temperature lower than the first temperature responsive to reducing a quantity of the received heat, wherein the evaporator is configured to vaporize the working fluid to the vapor state at the second temperature;
a pump coupled to the evaporator by a conduit, the pump configured to reduce pressure of the vaporized working fluid, wherein the heat engine is coupled to the pump, wherein the pump is powered by the energy generated by the heat engine;
a condenser coupled to the pump by the conduit, the condenser operable to receive the working fluid in the vapor state from the evaporator through the conduit and to condense the working fluid to working fluid in a fluid state; and
a generator comprising a turbine coupled to the condenser, the generator operable to receive the working fluid from the condenser and to use the working fluid to generate power.

18. The system of claim 17, the working fluid comprising a fluorocarbon recirculated in the power generation system.

19. A system, comprising:
an evaporator configured to vaporize a working fluid to a vapor state, the evaporator comprising a boiler within which the working fluid is configured to be vaporized;

a heat engine coupled to the evaporator, the heat engine operable to receive heat from a non-carbon heat source and to transfer heat to the evaporator to vaporize the working fluid into the vapor state, the evaporator configured to cool the heat engine using the working fluid in the vapor state, the heat engine configured to generate energy using the heat from the non-carbon heat source;

a heat step down attachment coupled between the heat engine and the evaporator, the heat step down attachment operable to be heated to a first temperature responsive to receiving the heat from the heat engine and to reduce a quantity of the received heat to a second temperature lower than the first temperature responsive to reducing a quantity of the received heat, wherein the evaporator is configured to vaporize the working fluid to the vapor state at the second temperature;

a condenser coupled to the evaporator by a conduit, the condenser operable to receive the working fluid in the vapor state from the evaporator through the conduit and to condense the working fluid to a fluid state;

a vacuum pump coupled in-line to the conduit, the vacuum pump powered by the heat engine and operable to reduce pressure in the evaporator, wherein the vacuum pump is coupled to the heat engine and is powered by the energy generated by the heat engine;

an output coupled to the condenser, the output operable to receive the working fluid from the condenser and to provide the working fluid for use;

a second evaporator coupled to the evaporator and the vapor pump, the second evaporator operable to provide cooling to a fluid circulating through the second evaporator.

20. The system of claim 19, the heat transfer engine comprising a Stirling engine, the Stirling engine configured to transfer heat between the non-carbon heat source and the heat step down attachment coupled to the evaporator.

\* \* \* \* \*